No. 746,284. PATENTED DEC. 8, 1903.
J. W. CARLETON.
PLATE CHUCK.
APPLICATION FILED FEB. 14, 1901.
NO MODEL.

Witnesses
B. C. Woodford.
P. J. Egan.

Inventor
John W. Carleton.
By James Shepard.
Atty.

No. 746,284. Patented December 8, 1903.

UNITED STATES PATENT OFFICE.

JOHN W. CARLETON, OF NEW BRITAIN, CONNECTICUT, ASSIGNOR TO THE UNION MANUFACTURING COMPANY, OF NEW BRITAIN, CONNECTICUT.

PLATE-CHUCK.

SPECIFICATION forming part of Letters Patent No. 746,284, dated December 8, 1903.

Application filed February 14, 1901. Serial No. 47,264. (No model.)

*To all whom it may concern:*

Be it known that I, JOHN W. CARLETON, a citizen of the United States, residing at New Britain, in the county of Hartford and State of Connecticut, have invented certain new and useful Improvements in Plate-Chucks, of which the following is a specification.

My invention relates to improvements in plate-chucks; and the object of my improvement is to provide this class of chucks with a drill-driving device.

Figure 1:
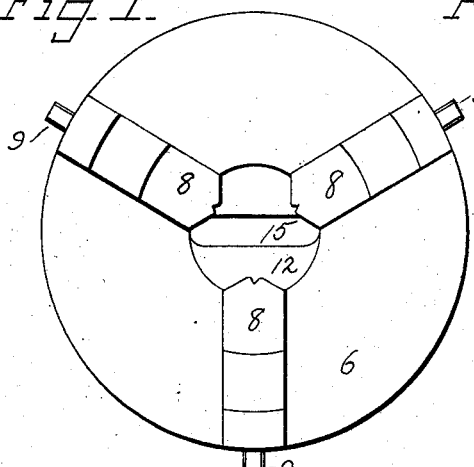
Figure 2:
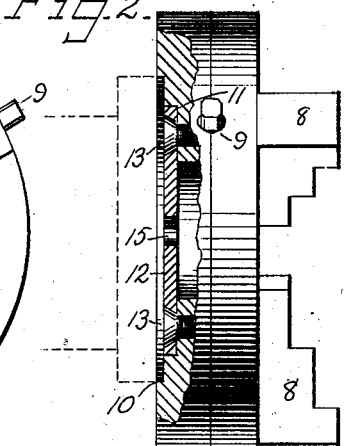
Figure 3:
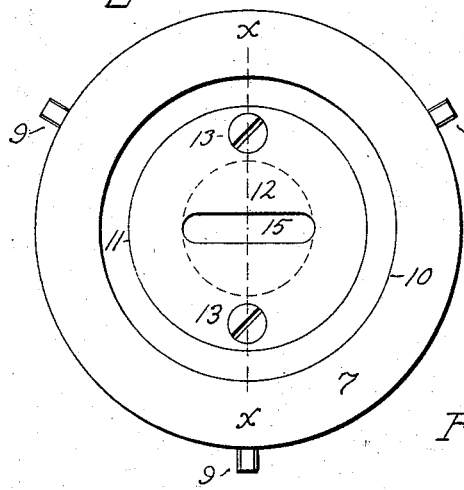
Figure 4:
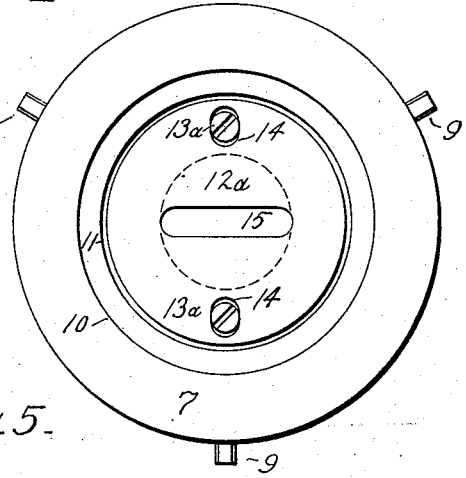
Figure 5:
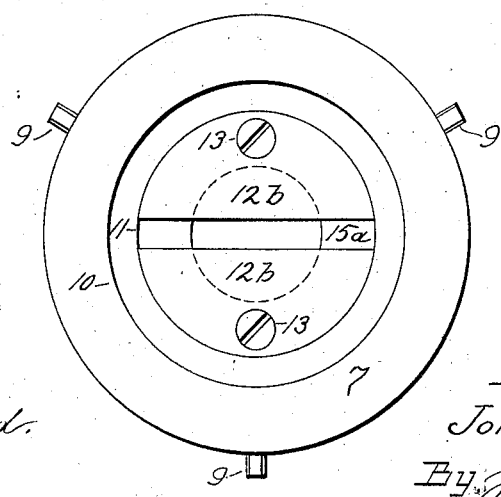

In the accompanying drawings, Figure 1 is a front or face view of my chuck. Fig. 2 is a side elevation of the same with a portion thereof shown in section on the line $x\ x$ of Fig. 3. Fig. 3 is a rear elevation. Figs. 4 and 5 are rear elevations showing modifications.

The chuck as shown is formed with front and rear plates 6 7, three jaws 8, and three screws 9, all of an ordinary construction. I call it a "plate-chuck" by reason of its plate or disk like form, and by that term intend to include the various forms of universal chucks and chucks of like form having independently-operated jaws without regard to whether the chuck-body is formed of one or two plates. These chucks are generally provided with a shallow recess on the back, as at 10, the same being intended to receive a flanged hub, to which the chuck is secured and by means of which hub the chuck may be fitted to any desired lathe. Such a flanged hub is partially indicated by broken lines in Fig. 2.

I form a recess 11 in the bottom of the recess 10 on the back of the chuck, and in the said recess I secure a slotted disk 12 to receive the flattened shank of a drill to prevent the drill from slipping within the chuck-jaws in case the chuck should be used to drive a large drill, as is sometimes done. I secure the slotted disk 12, so as to necessitate its rotation with the chuck, by means of pins or screws 13, that extend through the disk and into the back of the chuck. The disk 12 may be fitted closely to the recess 11, as shown in Figs. 2 and 3, in which case it is rigid and immovable in the back of the chuck.

In Fig. 4 I have illustrated the slotted disk 12$^a$ as of a diameter slightly smaller than that of the recess 11 and with the holes 14 for the pins or screws 13$^a$ as elongated in a direction transversely to the slot 15, that receives the flattened portion of the drill. If the said flattened portion is of less width than the length of the slot 15, it will allow for some variation in the direction of the length of the said slot in seating the drill in the chuck in case the flattened portion is not perfectly concentric. So, also, the elongated holes 14 for the screws 13$^a$ permit a like variation in the transverse direction of the slot 15 for the same purpose. The screw-heads for holding either form of slotted disk may have heads of more or less projection in order to hold the disk temporarily in place; but the main function of the said pins or screws 13 or 13$^a$ is to serve as means for necessitating the rotation of the driver with the chuck. After the flanged hub (shown by broken lines in Fig. 2) is secured to the chuck the slotted disk cannot be displaced, even if the pins or screws are headless, as at 13$^a$, Fig. 4.

In Fig. 5 I have shown substantially the same form of rigid driver as in Figs. 2 and 3, only instead of a slotted disk I have employed two partial disks 12$^b$, secured in the same recess 12 by means of the pins or screws 13, the space 15$^a$ between the said two partial disks being the equivalent of the slot 15, and therefore the said two partial disks 12$^b$ are the equivalent of the slotted disk 12.

In each form of my improvement the chuck is of the ordinary plate-like form adapted especially for use on engine-lathes. The disk-like driver is in the back part of the chuck, leaving the central opening in the chuck in front of the driver and back of the jaws perfectly free and unobstructed for nearly the full thickness of the chuck. When desired to use the chuck in connection with a hollow mandrel, so that a round bar or shaft may be extended into the mandrel, the slotted disk may be readily removed by taking off the flanged hub and readily replaced again when desired.

I claim as my invention—

1. A plate-chuck having holding-jaws on its front face, a slotted drill-driver at its back and a free and unobstructed opening for work to enter between the back of the said jaws and in front of the said driver, substantially as described.

2. A plate-chuck having in its back face the shallow recess 10 to receive a flanged hub by which the chuck is mounted, a second shallow circular recess 11 of a smaller diameter in the bottom of the recess 10, a thin disk-like drill-driver seated in said second recess and driving pins or screws extending forwardly through the said drill-driver into the back of the chuck, for necessitating the rotation of the said driver with the said back of the chuck, substantially as described.

JOHN W. CARLETON.

Witnesses:
 JAMES SHEPARD,
 B. C. WOODFORD.